July 1, 1924.

R. W. BRADEN ET AL 1,499,637

ATTACHMENT FOR LOCOMOTIVES

Filed March 7, 1923

Inventors
Charles Stern &
Richard W. Braden,

By

Attorney

July 1, 1924.

R. W. BRADEN ET AL

1,499,637

ATTACHMENT FOR LOCOMOTIVES

Filed March 7, 1923   9 Sheets-Sheet 4

Inventors
Charles Stern &
Richard W. Braden,
By James R. Bowen
Attorney

July 1, 1924.

R. W. BRADEN ET AL

1,499,637

ATTACHMENT FOR LOCOMOTIVES

Filed March 7, 1923

Inventor
Charles Stern &
Richard W. Braden,

By James R. Bowen
Attorney

July 1, 1924.

R. W. BRADEN ET AL 1,499,637

ATTACHMENT FOR LOCOMOTIVES

Filed March 7, 1923  9 Sheets-Sheet 9

Inventor
Charles Stern
and Richard W. Braden
By James R. Bowen
Attorney

Patented July 1, 1924.

1,499,637

UNITED STATES PATENT OFFICE.

RICHARD W. BRADEN, OF NEW YORK, N. Y., AND CHARLES STERN, OF JERSEY CITY, NEW JERSEY, ASSIGNORS TO B. & S. MANUFACTURING PRODUCTS CORPORATION, OF JERSEY CITY, NEW JERSEY, A CORPORATION OF NEW JERSEY.

ATTACHMENT FOR LOCOMOTIVES.

Application filed March 7, 1923. Serial No. 623,525.

*To all whom it may concern:*

Be it known that we, RICHARD W. BRADEN and CHARLES STERN, citizens of the United States, residing at the borough of Manhattan, in the county, city, and State of New York, and Jersey City, in the county of Hudson and State of New Jersey, respectively, have invented certain new and useful Improvements in Attachments for Locomotives, of which the following is a specification.

The present invention relates to improvements in attachments for locomotives in which provision is made for supplying steam to valve chests and cylinders whenever a locomotive is drifting or being towed; and the invention resides more particularly in a compact control piece carried by the locomotive and which may have communication with both of the valve chests and with a source of steam, in which device are associated and arranged a valve and its controlling means operated upon by the presence and absence of steam in the valve chests.

Other objects of the invention are to accomplish the supply of steam to the valve chests and cylinders of a locomotive in order to keep the parts at running temperature and to break any vacuum tending to form therein when the locomotive is in motion with the throttle closed and to effect this supply of steam faithfully and in sufficient quantities; to provide a device for serving this purpose which will act reliably and which comprises a relatively inexpensive and small device which may be conveniently attached to the saddle or other parts of a locomotive without requiring any special alteration in the locomotive structure or the removal or rearrangement of any of the locomotive parts to provide space to receive the same.

With the foregoing and other objects in view, the invention will be more fully described hereinafter, and will be more particularly pointed out in the claims.

In the drawings, wherein like symbols refer to like or corresponding parts throughout the several views.

Figure 9:
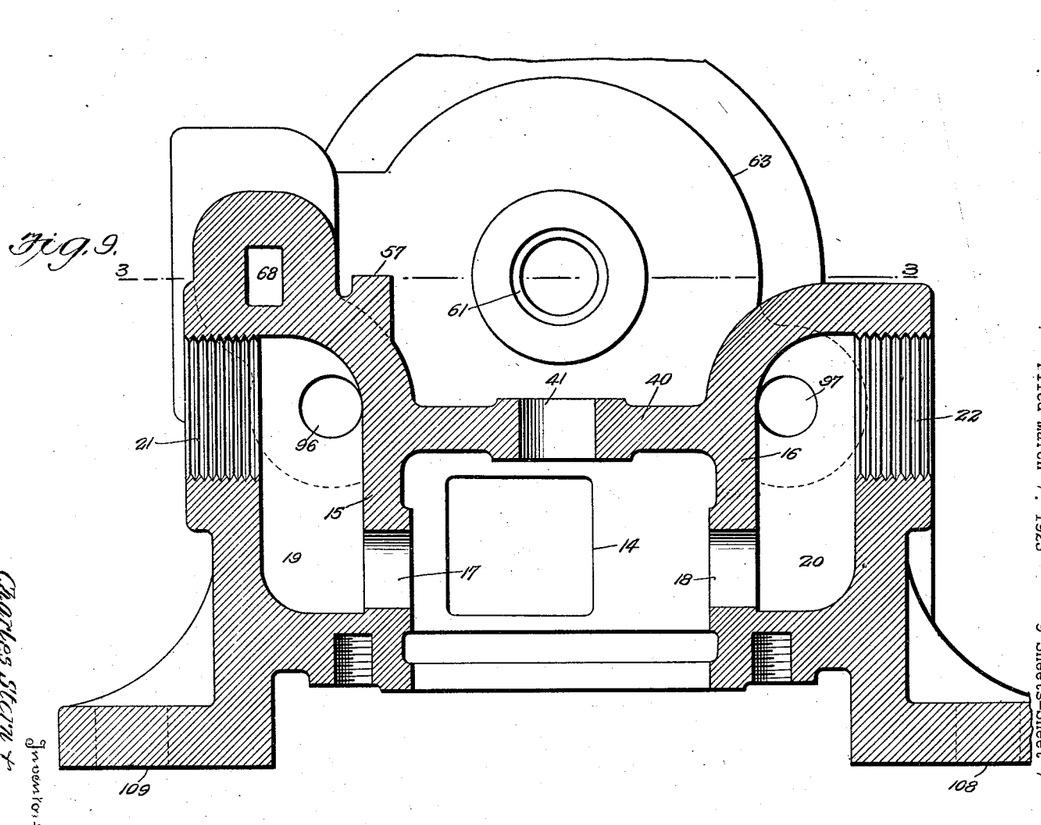
Figure 9 is a cross section taken centrally through the device on the line 9—9 in Figure 3 and illustrating the main casting with the valve parts and connections removed.
Figures 10, 11:
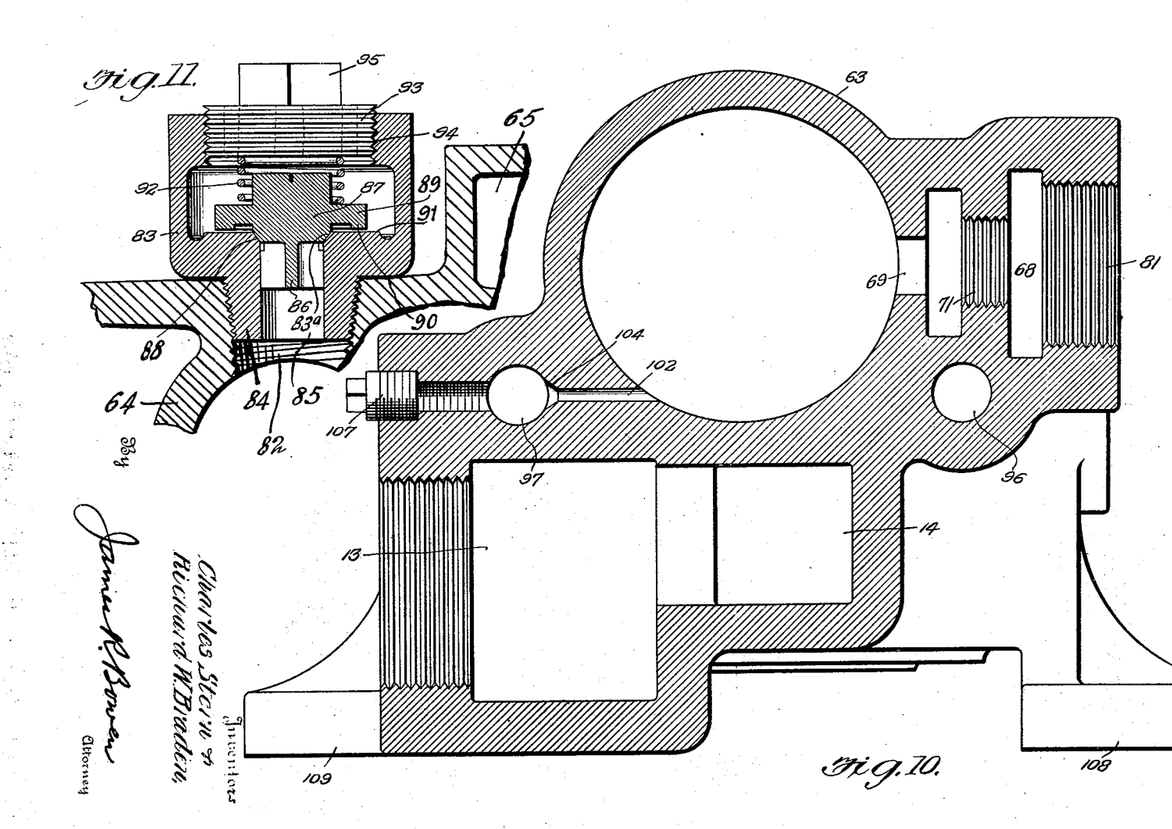
Figure 10 is also a transverse section taken through the casting at the larger cylinder on the line 10—10 in Figure 2 with the valve removed.
Figure 11 is a longitudinal section taken through the relief valve on the line 11—11 in Figure 2.

Referring more particularly to the drawings the device comprises generally a casing in the lower central portion of which is a cylinder 12 which is in communication with a source of steam through a passage 13 shown in Figure 10 and having screw threads by which a steam pipe may be coupled thereto. This steam passage is shown in Figure 9 as communicating with the cylinder 12 by means of a port 14 through one of the vertical walls of the casing. The lateral walls 15 and 16 of the cylinder 12 are shown as provided with ports 17 and 18, respectively, whereby the interior of the cylinder may be placed in communication with the valve chests of the locomotive on which the device is placed by conduits from 21 and 22; the object being to supply steam, with which the cylinder is at all times supplied, for instance directly from the boiler to the valve chests and cylinders of the locomotive in order to break any vacuum tending to occur therein when the throttle is closed and the locomotive moving and further to cushion the reciprocating parts and keep the surrounding metal at running temperature. The ports 17 and 18 just referred to are shown as opening outwardly upon channels 19 and 20 which rise vertically from the ports and have lateral outlets threaded as indicated at 21 and 22 to receive pipes by which the channels and the cylinder are in communication with the opposite steam chests of the locomotive, it being understood that a desirable location for the present device is between the steam chests and the saddle will probably provide the most convenient place on which to install said device.

Figures 4, 12:
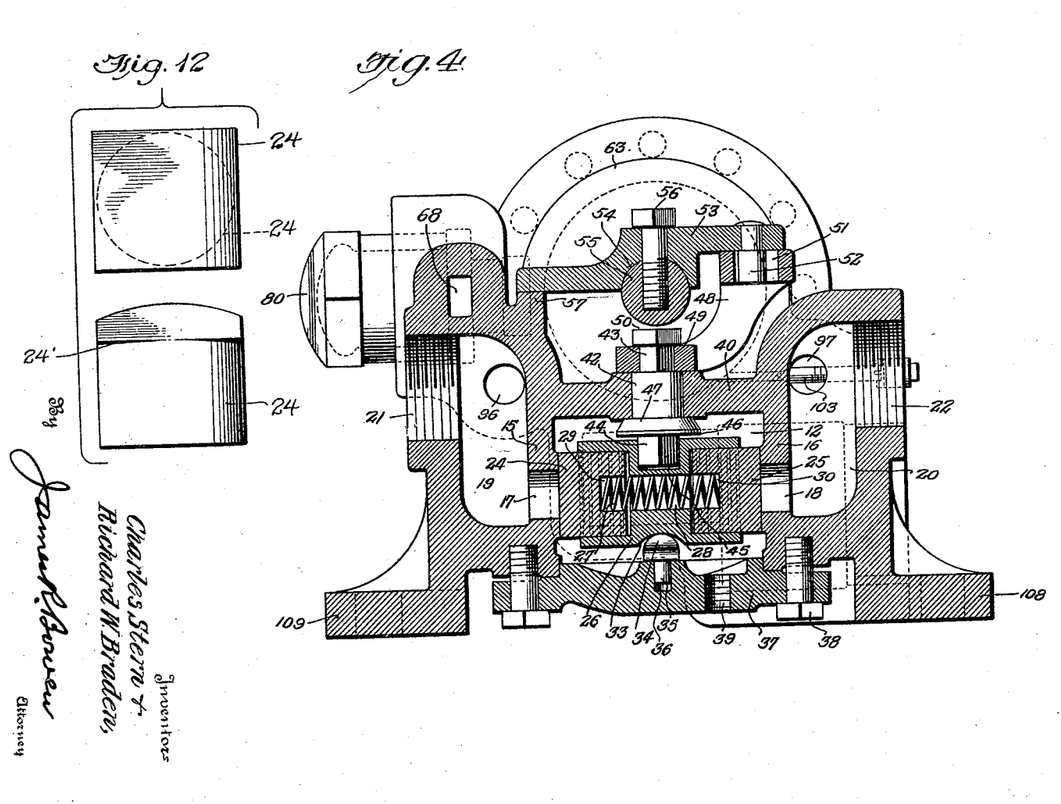
Figure 4 is a transverse section taken centrally through the device.
Figure 12 is an end view of one of the valve shoes.

The ports 17 and 18 are normally closed by valve shoes 24 and 25 which are shown as carried within recesses made within the valve block 26 which is journaled for circular movement upon a vertical axis within the cylinder 12. The valve shoes 24 and 25 are urged outwardly by a coil spring 27 shown as extending through passage 28 made centrally through the block 26, the ends of the spring engaging in sprockets 29 and 30 in the inner faces of the valve shoes. The pressure of steam in the cylinder 12 against the corners of the valve shoes presses the valve shoes tightly against the wall of the cylinder 12. In this way the shoes are kept in close contact with the segments 31 and 32 (Figures 5 and 7) provided on the interior wall of the chamber to receive the outer edges of the valve shoes which are curved to correspond with the curvature of the chamber wall and said segments. As shown in Figure 4 the valve block is made with a socket 33 centrally beneath the same to receive the rounded head 34 of a stud having a shank 35 resting in a recess 36 in the bottom cover plate 37, which may be bolted or otherwise secured to the casing as by the fastenings shown at 38. The stud may be lifted out and replaced when worn or broken upon the withdrawal of the head 37 and the head also provides a drain or outlet 39 for condensed steam. This outlet may be provided with any suitable condensation check valve.

Figures 5, 6, 13:
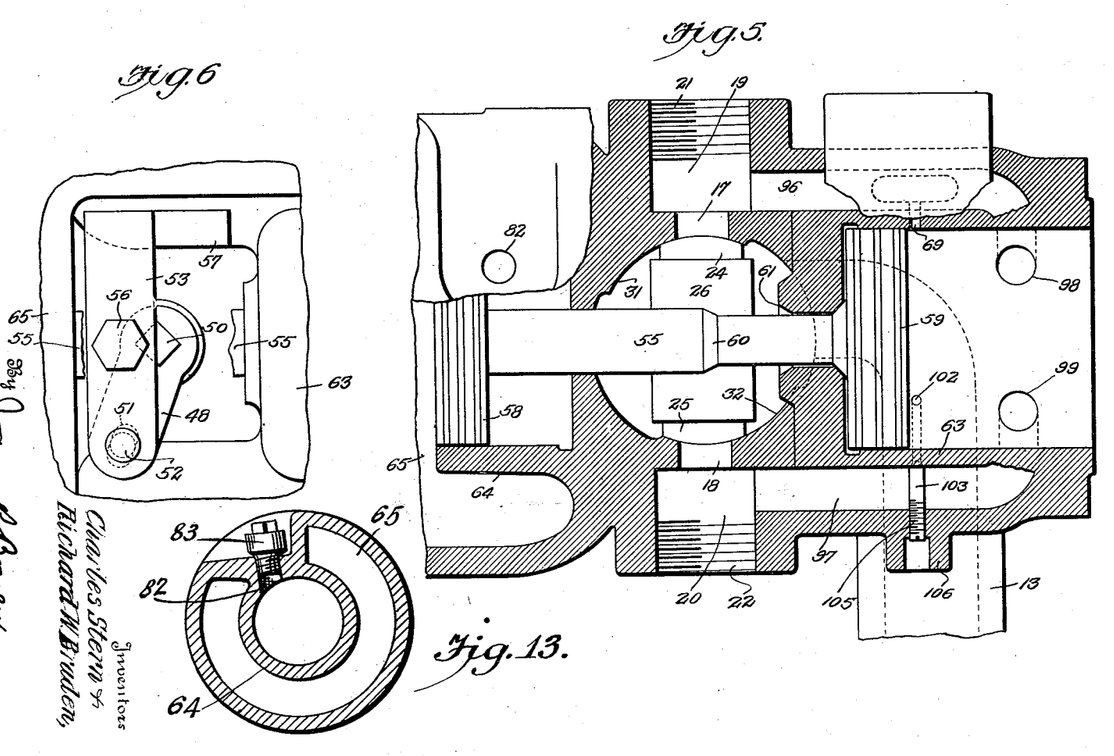
Figure 5 is a diagram showing the position of the pistons with reference to the valve when the latter is in a closed position.
Figure 6 is a fragmentary plan view showing the position of the valve operating connections when the pistons are in the position indicated in Figure 5.
Figure 13 is a section taken on a small scale on the line 13—13 in Figure 2, the relief valve being shown in elevation.
Figure 7:
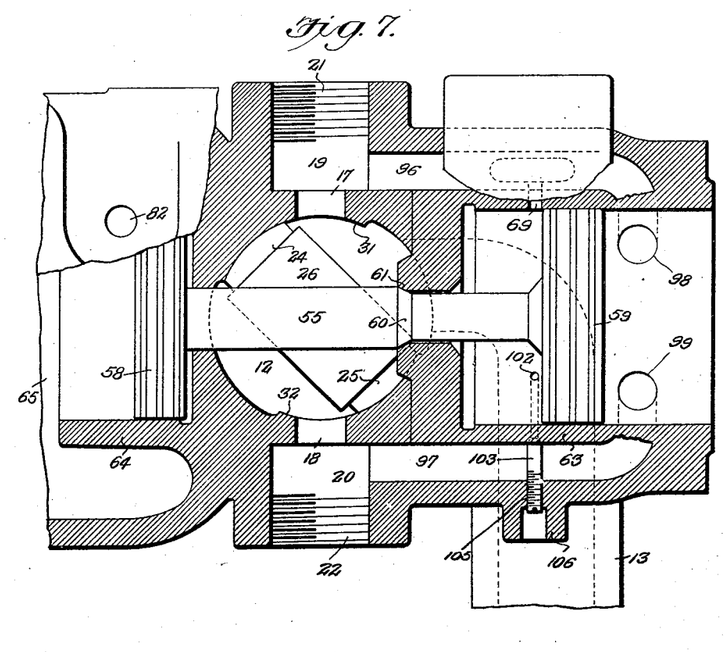
Figure 7 is also a diagrammatic view similar to Figure 5 but showing the pistons in a subsequent position with the valve open.

The steam received from the boiler into the cylinder 12 is prevented from escape while the valve shoes are in the position indicated in Figure 5, but when the block and the shoes are in the open position illustrated in Figure 7 the steam may escape through the ports and to the valve chests and cylinders of the locomotive through the system of passages already described.

We provide in conjunction with the valve an apparatus automatically controlled for shifting this valve to the open or closed position, and this movement of the valve is intended to bear a definite relationship to the closed and open positions of the throttle. In other words when the throttle is open steam is being delivered to the valve chests and cylinders as during the normally running of the locomotive, then the valve should be closed to avoid any interference of the steam. However, when the engineer closes the throttle and allows the locomotive to coast or drift or when the locomotive is being towed, it is desirable to have a supply of steam delivered to the valve chests and to the locomotive cylinders. We, therefore, provide a control device in conjunction with the valve for moving this valve in accordance with conditions within the steam chests. This device is described as follows:—

The top 40 of the cylinder 12 may be provided with a cylindrical bore 41 which may be reinforced by enlargements above and below, as shown in Figures 4 and 9; and in this bore there is shown as mounted the cylindrical enlarged intermediate portion 42 of a vertically disposed turning post. The turning post is shown as having a squared upwardly projecting stud 43 and a reduced and squared lower stud 44 projecting into the cylinder 12 and into a recess 45 made in the upper surface of the block 26 which is also shown as squared to correspondingly fit said stud. A shoulder 46 is shown as provided upon the turning post just beneath the cylindrical part and as having a rounded bearing 47 taking against the under side of the cylinder top 40.

A curved arm 48 is shown as connected with the top stud 43 of the turning post as by being provided with a square socket 49 to receive the stud. The arm is shown as confined upon the stud by a nut 50. The arm is shown as curved upwardly and away from the turning post and as slotted at its upper end, as indicated at 51, the length of the slot being radial with respect to the axis of the turning post. The slot is slidingly occupied by a downwardly projecting stud 52 shown as mounted upon one end of the arm 53 which may be rounded at its intermediate under side, as represented at 54, in order to snugly fit upon the piston rod 55, to which it is shown as secured as by the screw 56 threaded into said piston rod. The other end of the arm is shown as resting slidingly upon a guide 57 which may be a part of the casing.

Figure 8:
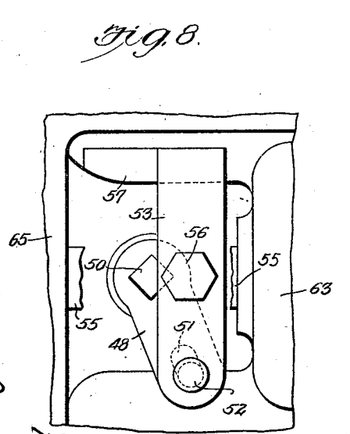
Figure 8 is a view similar to Figure 6 with the connections in a position corresponding with this movement of the valve.

The movement of the arms 48 and 53 is shown in Figures 6 and 8.

Figure 3:
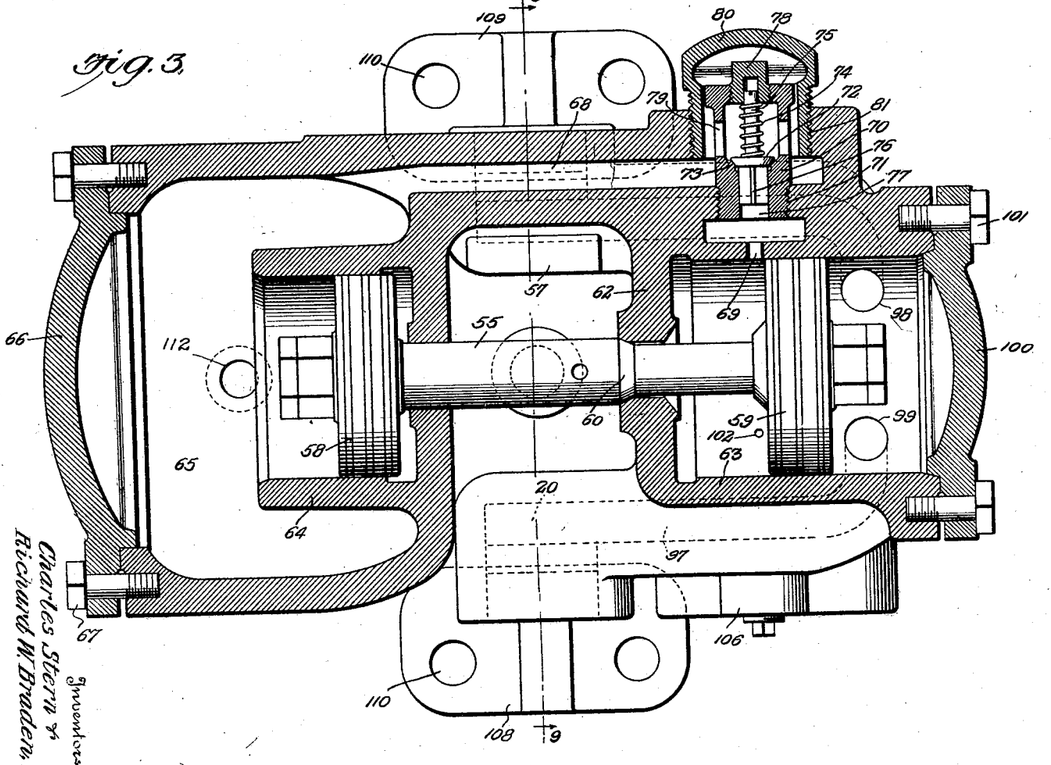
Figure 3 is a longitudinal section taken through the control cylinders on the line 3—3 in Figure 9.

In Figures 3, 5 and 7 the piston rod is shown as made up of large and small diameters having pistons 58 and 59 coupled rigidly to the opposite ends thereof and shown as provided with a frustoconical valve face 60 at the intersection of the large and small diameters of the stem, which valve facing is adapted to cooperate with and close against a similarly formed valve seat 61, the reduced portion of the piston having a rather loose fit in the head 62 of a comparatively large cylinder 63. In this large cylinder 63 fits the piston 59 being also of comparatively large diameter. The companion piston 58, at the other end of the piston rod 55, is similarly mounted to reciprocate in an opposed cylinder 64 which is of smaller diameter compared to the cylinder 63. The remote or far end of the cylinder 65 made in the shell or casing is closed as by a head 66 secured removably by the bolts or other fastenings 67 which enable the head to be taken off and access had to the interior of the chamber 65 and to the end of the piston rod.

The chamber 65 is shown as communicating by a passage 68 in the casing and extending longitudinally thereof with the other cylinder 63, in the side wall of which is shown a port 69 adapted to communicate with the cylinder 63 except when the piston covers said port. The port 69 is shown as communicating with the passage 68 through a check valve comprising a cage 70 threaded as indicated at 71 into an appropriate part of the casing and as being hollow and communicating interiorly with the port 69. A valve 72 is shown as mounted to reciprocate within the cage and to close normally against a seat 73 against which it is urged as by a coil spring 74 wound about the stem 75 which carries said valve 72. Guide wings 76 are shown as extending beneath the valve and as journaled in the cylindrical part 77 of the cage, while the outer end of the stem 75 may slide freely in a removable cap 78, by unscrewing which, the valve assembly may be removed through the outer end of the cage. The interior space of said cage beyond the valve 72 is shown as provided with ports 79 through which steam may pass into the passage 68. There is shown a dome cap 80 having a threaded shank secured removably into a threaded opening 81 made laterally through the casing wall and entering upon the passage 68, the shank of the dome cap being shown as greater in diameter than the valve casing in order to provide an annular passage for the free transference of steam between these parts.

The chamber 65 which communicates with the passage 68 and with the remote end of the cylinder 64 is shown as ported as indicated at 82 to receive the relief valve shown in Figures 11 and 13. This relief valve is shown as comprising a shell 83 having a reduced and threaded shank 84 at one end adapted to take into said opening or port 82 of the chamber 65. In the shank 84 a bore 85 is shown slidingly receiving the cruciform guide 86 upon the inner end of the valve body 87 which is adapted to take against the conical seat 88 provided at the outer end of the bore, said valve body having a correspondingly formed face to act as a complement to this seat 88. The shoulder part 89 of the valve body is shown as provided with an inwardly turned rim 90 adapted to cooperate with the raised interior surface or shoulder 91 within the base of the shell 83 to avoid rocking or canting of the valve body such as would result in the casual shifting of the body to one side away from its seat. These parts cause the body to move in equally as to all circumferential parts of the seat and to therefore effect a tight closure. The shoulder 89 is also useful to form an abutment for the inner end of a coil spring 92 which is shown as received at its outer end against a screw plug 93 adjustably threaded into an opening 94 in the outer portion of the shell. The plug may be provided with a square or other appropriately shaped stud 95 to readily take a wrench or other implement for effecting the adjustment, or removing or replacing the plug.

The valve 72 is merely a check valve opening in one direction only and closed—whenever the pressure in the chamber 65 equals, or exceeds, that in the cylinder 63. The spring 74 aids the valve 72 in closing and is an aid to the closing of the valve by the steam pressure acting on the outer larger area of said valve.

The relief valve 87 will only blow upon a predetermined pressure, say five lbs. or over, but this valve will not blow all of the time the locomotive is running because the piston 58 cuts off the relief valve port 82 from the chamber 65 while the throttle is open. See Figure 5.

As shown in Figures 5 and 7 and also as indicated in dotted lines in Figure 3, the vertical passages 19 and 20 at the side of the cylinder 12 communicate with horizontally extending passages 96 and 97, which are shown as terminating in the large cylinder 63 through ports 98 and 99 respectively. Such outer end of the cylinder is shown in Figure 3 as closed by a removable head 100 secured in place by the bolts or other fastenings 101.

As shown in Figures 5 and 10 another port 102 enters the large cylinder 63 at an intermediate portion and this port is shown as communicating with the passage 97. A needle valve 103 may be arranged to cooperate with a seat 104 at the end of the port 102 adjoining the passage 97, this needle valve being shown as threaded at 105 in Figures 5 and 7 in the outer shell wall and as being protected by a surrounding socket 106 allowing the end of the needle to be adjusted. Or a plug may be removably secured into the outer end of the shell at this point as designated at 107 in Figure 10. The plug may be removed for cleaning out the port 102.

The device is shown as provided with a base 108 and 109 having perforations 110 by which the device may be secured to the saddle of a locomotive or other appropriate part. It will be noted that the cylinder 12 is shown as occupying the center lower portion of the casting and that the cylinders 63 and 64 are shown as raised above the cylinder 12 and as located at the end portions of the casting in order that they may the better cooperate with the pin by which the valve in the cylinder 12 is moved.

When the engineer opens the throttle to start the locomotive steam from one of the steam chests enters at the passage 20 and thence flows through the passage 97 to the cylinder 63. Steam from the other steam chest enters at the passage 21 and thence flows through the passage 96 to the cylinder 63. Steam from the cylinder 63 forces the piston 59 over. When the piston 59 (which is larger than the piston 58) is forced over steam from the cylinder 63 enters the passage 69 and the valve 72 is opened. When the valve 72 is opened steam may pass into the passage 68 and thence into the chamber 65. The device will remain in this position until the throttle is shut off. When the throttle is shut off steam from passage 68 presses against the larger area of the valve 72 closing the valve 72. The spring in the valve 72 also tends to hold the valve 72 closed. When the valve 72 is closed no more steam can pass through the passage 68 into the chamber 65. Also when the valve 72 is closed the steam will be held in the chamber 65.

The pressure of steam in the chamber 65 against the piston 58 will force the piston 58 over due to reduction of pressure in cylinder 63. As the piston rod 55 moves over to right as shown in Figure 3 it carries over with it the arm 53. The movement of the arm 48 causes the turning post to turn and as this turning post is connected with the shut off block holder the valve shoes 24 and 25 are caused to move and thereby the ports 17 and 18 are opened up. When the port 17 is opened steam from the cylinder 12 may enter the passage 19 and from the passage 19 through 21 to one of the steam chests. The opening of the port 18 permits steam from the cylinder 12 to enter the passage 20 and from the passage 20 steam may go through 22 to the other steam chest.

In its movement the piston rod 55 carries with it the piston 59. When the piston 59 is moved over sufficiently far the port 102 will be in front of the piston 59 and steam from the cylinder 12 will enter the passages 17 and 18, 19 and 20, 97 and 96, and from the passage 97 will enter the port 102 and thence that part of the cylinder 63 which is in front of the piston 59. In this position the valve face 60 will impinge against the valve seat 61 and prevent the escape of steam at that point, but steam from the part of the cylinder 63 which is in front of the piston 59 may enter the passage 69 and raise the valve 72 and steam may then enter the passage 68 and go into the chamber 65 and thence into cylinder 64.

The port 102 thus furnishes steam to the chamber 65 while the locomotive is moving with the throttle closed in order to maintain the necessary pressure against the outer face of the piston 58. This is essential in order that the shut-off blocks may be held in the constant open position shown in Figure 7.

When the pressure of steam in the cylinder 64 and chamber 65 exceeds the pressure of the spring 92 of the relief valve in the opening 82 the excess pressure of steam will open the valve formed by the seat 88 and the complementally formed face 83$^a$ and may be discharged through holes in the plug 93.

When the engineer closes the throttle the pressure will immediately fall in the outer end of cylinder 63 and the operation and position of the parts for drifting or when the locomotive is being towed are as follows:—

The falling of the pressure in cylinder 63 enables the accumulated pressure in chamber 65 to force the pistons 58 and 59 over to the position shown in Figure 7.

In this position of the piston 58 the relief valve port 82 in cylinder 64 is exposed allowing all the steam in chamber 65 to escape except say five pounds if the relief valve has been adjusted at five pounds. This five pounds pressure in the cylinder 64 is sufficient to hold the piston 58. In addition the pressure in the cylinder 63 between the head 62 and the piston 59 also holds the piston 59 and with it the piston rod 55, and piston 58 in the relative position shown in Figure 3. When the parts are as shown in Figure 3 or Figure 7 the shut-off blocks 24 and 25 are open and steam from the central cylinder 12 may enter the passages 97 and 102 and enter the inner portion of the cylinder 63. Steam from the cylinder 63 also presses into the passage 69 and raises the seat 72 permitting steam to flow through passage 68 into the chamber 65, and when it gets to the chamber 65 the surplus pressure above say the five pounds is blown out through the relief valve.

When the locomotive is being brought to a stop steam from the steam chests backs up through 22 and 21 and enters 19 and 20, and thence goes to 97 and 96 and into cylinder 63 striking behind the piston 59 and forcing the piston 59 over to the left as shown in Figure 5. The valve face 60 being then raised from the valve seat 61 any steam in the cylinder 63 between 62 and piston 59 will be forced to exhaust. This movement of the piston 59 to the left causes a movement of the piston 58 in the same direction and the discharge of steam through the relief valve port 82 will be shut off and such steam as remains in the chamber 65 may condense. A suitable port such as 112, shown in Figs. 1 and 3 may be provided to care for the condensed steam. When the piston 59 moves to the left carrying with it the piston rod the shut off block shoes will close the ports 17 and 18, thereby shutting off the steam from cylinder 12.

Referring to Figure 12 the valve shoes are shown as substantially square or having corners 24' exposed to the steam pressure within the cylinder 12, whereby this pressure acts to press the shoes tightly against the wall of cylinder 12 and avoids the escape of steam when the valve shoes are in the position indicated in Figure 5.

Figure 1:
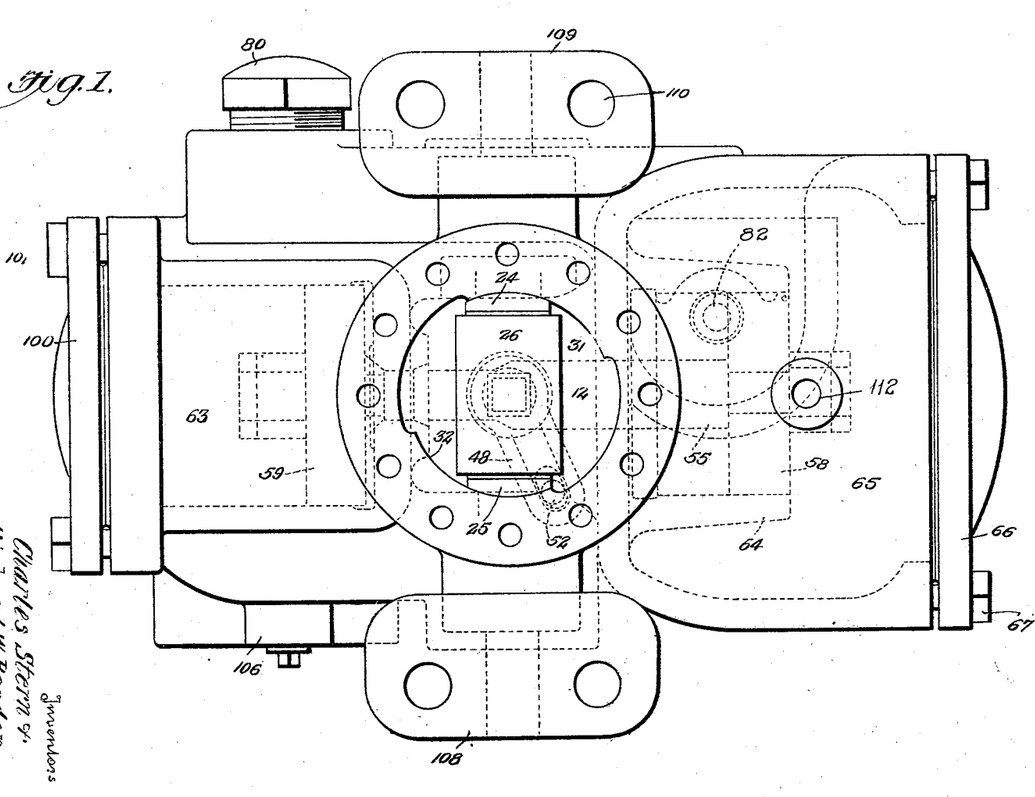
Figure 1 is a bottom plan view of a device constructed according to the present invention.
Figure 2:
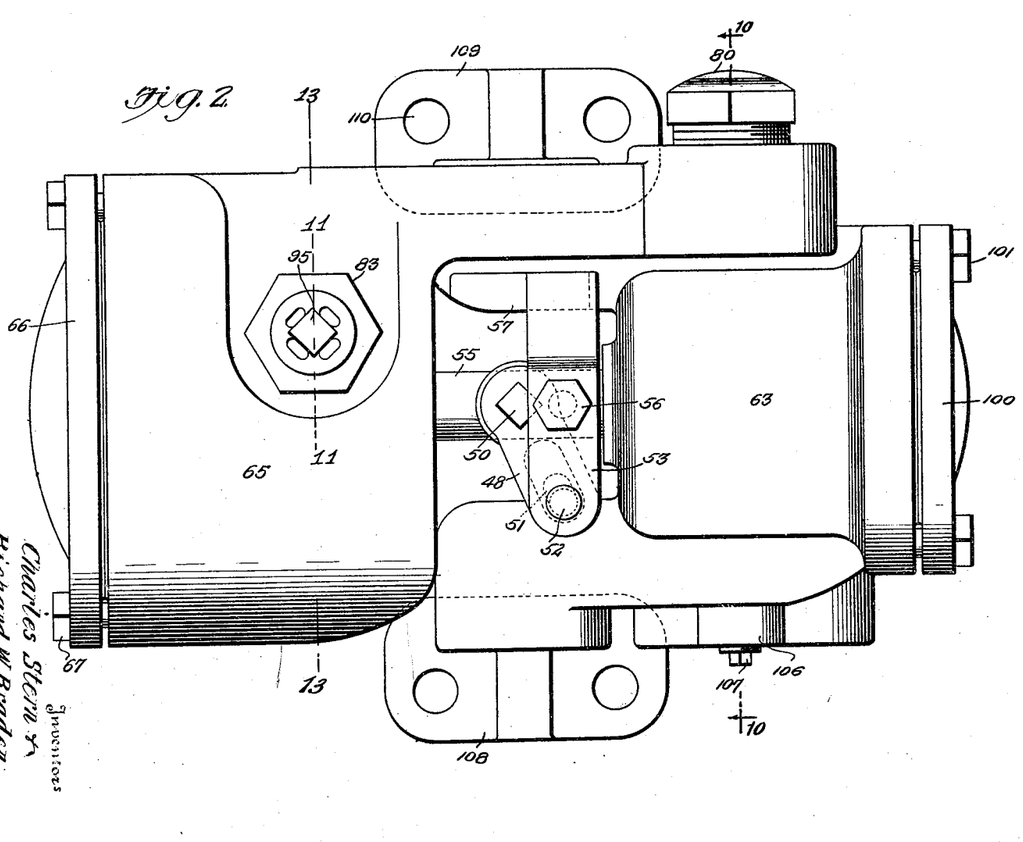
Figure 2 is a top plan view of the same.
Figure 14:
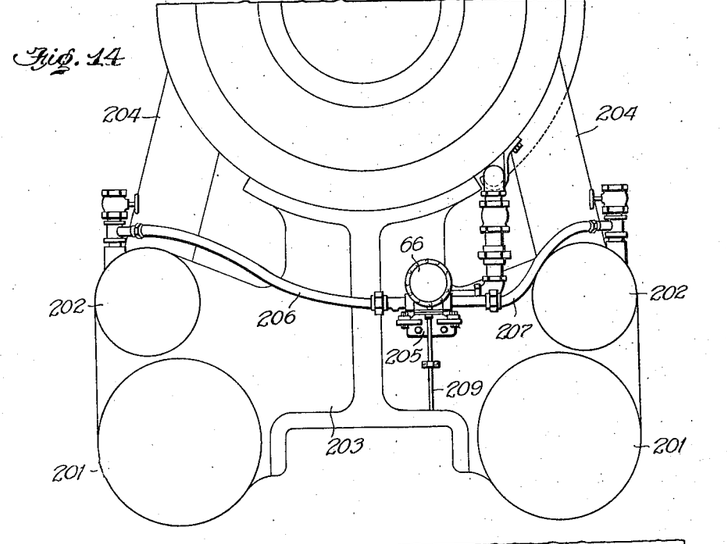
Figure 14 shows a partial front view of a locomotive with the improved device installed thereon and coupled with the valve chests.
Figure 15:
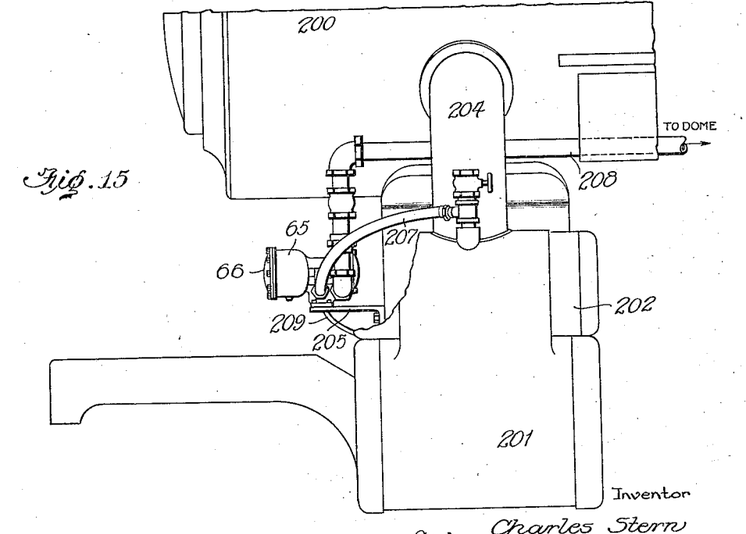
Figure 15 is a side view of the same.

Referring more particularly to Figures 14 and 15, 200 designates generally a locomotive having the cylinders 201 and the valve chest 202 carried by the saddle 203 in accordance with the usual practice. The locomotive steam supply pipes are indicated at 204. The improved device is shown as mounted on a bracket 205 bolted or otherwise affixed to the saddle and projecting forwardly therefrom toward one side of the locomotive. The pipes 206 and 207 are coupled to the ports 21 and 22 as shown in Figure 9 and these pipes extend to the valve chests 202. A pipe 208 extends from the steam dome to the connection 13 as shown in Figure 10. The pipe 209 is a drain pipe extending from the port 112 as shown in Figure 1. Obviously other modes of connection might be adopted.

It is obvious that various changes and modifications may be made in the details of construction and design of the above specifically described embodiment of this invention without departing from the spirit thereof.

What we claim is:—

1. A locomotive attachment comprising a casing containing a chamber in connection with a source of steam supply and with the locomotive steam chests, valve means in said chamber for opening and closing the communication between the chamber and the valve chests, valve-actuating means having opposite faces of differential area exposed to the steam from the steam chest whereby such steam may during the normal running of the locomotive with the throttle open shift said valve-actuating means to close the valve means and shut off the communication between said chamber and the steam chests, the steam pressure against the larger area of said valve-actuating means adapted to fall when the throttle is closed and when the steam chest pressure falls, and means for trapping the steam on the face of said valve-actuating means having the smaller area whereby to cause shifting in the opposite direction of the valve-actuating means when the steam is cut off from the valve chests and a consequence opening of said valve.

2. A locomotive attachment comprising a casing connecting with a valve chest of a locomotive and with a source of steam supply, valve means in said chamber to open and close the communication with the valve chest, cylinders adjoining said casing of unequal diameters, pistons therein coupled for uniform movement, the larger cylinder at its outer end having communication with the valve chest, said casing having a passage between said cylinders for allowing the steam in the larger cylinder to pass to the smaller cylinder and to press upon opposite faces of said pistons, means to trap steam in the cylinder having the smaller diameter to open the valve means, and a coupling between said pistons and said valve means.

3. A locomotive attachment comprising a casing, having cylinders therein of differential diameter in communication at their outer ends, the larger cylinder at its outer end adapted to receive steam from the valve chests of a locomotive, means to permit the flow of such steam from the cylinder of larger diameter to that of the smaller diameter but preventing a return flow of such steam, pistons in said cylinders, means to rigidly connect said pistons; a chamber in said casing in communication with a source of steam supply and having connection with the steam chests, a valve to control this connection, and connections between said valve and said means for connecting the pistons.

4. An attachment for locomotives having a source of steam and a steam chest comprising a casing connected with the source of steam and the steam chest having cylinders therein of unequal diameters, connected pistons in said cylinders, the larger cylinder being in connection at its outer end with the valve chest, the remote ends of the cylinders being in controlled communication, means opened by the movement of the pistons in one direction to cause steam from said source to be delivered to the valve chest and closed upon the opposite movement of the pistons, said casing having a passage to deliver steam to the proximate end of the larger cylinder when the piston is in the outer end thereof whereby to retain the pressure in the smaller cylinder.

5. A locomotive attachment comprising a casing having a large and a small cylinder, pistons therein, a rod connecting said pistons for simultaneous movement, said casing having a passage connecting the remote ends of the cylinders, a valve in said passage permitting flow only from the larger to the smaller cylinder, the remote end of the larger cylinder receiving steam from the steam chests of a locomotive, a chamber in the casing for steam having connections to the valve chests of the locomotive, valve means coupled to said piston rod and adapted to close the communication of the chamber with the valve chests when steam is present in the valve chests, said chamber also having connection with the inner portion of the larger cylinder when the piston therein is in the out position, the steam from the inner portion of the larger cylinder adapted to flow through said passage to the outer end of the smaller cylinder to retain the pressure therein.

6. A locomotive attachment comprising a source of steam, a casing in connection therewith having large and small cylinders therein with a passage establishing communication between the far end of the smaller cylinder and both ends of the larger cylinder, pistons in the cylinders, the piston in the larger cylinder moving from one to the other side of the connection of the passage with this cylinder, said casing also having an inlet for steam to either side of the piston in the larger cylinder according to the position of said piston, means to connect the pistons, a valve opened by said means to deliver steam from said source to the steam chests of a locomotive, and connections between said valve and said piston-connecting means.

7. A locomotive attachment comprising a casing, large and small cylinders therein, pistons in the cylinders, a rod connecting said pistons having a valve face, said large cylinder having an outlet at its proximate end with a seat to receive said valve face, said casing having a passage connecting said cylinders, said passage connecting with the inner or outer portion of the large cylinder as controlled by the position of the piston, said larger cylinder being in connection at its outer end with steam from steam chests of a locomotive, a source of steam, said large cylinder also having communication with said source of steam at its inner portion when the piston therein is in the outer position whereby to furnish steam from said source to said passage to maintain the pressure in the small cylinder, and means opened by said piston rod to deliver steam to the steam chests from the source of steam.

8. A locomotive attachment comprising a casing, large and small cylinders therein, pistons in said cylinders, said large cylinder having ports intermediate thereof put either in connection with the inner or outer part of the cylinder in accordance with the outer or inner position of the piston respectively, said casing having a passage connecting one port with the outer end of the small cylinder, a valve in said passage opening only toward the smaller cylinder, a source of steam, means including the other port whereby steam may be introduced from said source into the inner portion of the larger cylinder when the piston therein is in the outer position whereby steam may be furnished to said passage and to the smaller cylinder for maintaining the pressure therein, means also whereby steam may be introduced into the outer portion of the larger cylinder, means connecting said pistons and acting to control the evacuation of the inner part of the large cylinder when the piston moves inwardly, means moved by said pistons to cause delivery of steam from said source to said steam chests of the locomotive, and means for allowing excess pressure in the smaller cylinder to escape.

9. A locomotive attachment comprising a casing having an intermediate ported chamber in its lower portion and opposed cylinders of unequal diameter in its upper end portions, pistons in the cylinders moved by the presence and absence of steam from locomotive steam chests, a rod connecting said pistons, a turning post journaled to turn through the top of the chamber and connected for circular movement to said rod, a block in the casing turned with said pin, and valve shoes carried by said block and controlling the ports of the chamber.

10. A locomotive attachment comprising a casing having means for attaching the same to a locomotive, a chamber within the central lower portion of said casing having ports in its sides, said casing having channels forming extensions to the ports and opening through the sides of the casing, said casing also having a passage for furnishing steam to the chamber, a pair of opposed cylinders at opposite ends of the casing above the plane of the chamber, said casing having passages leading from said channels to the outer end of one of said cylinders, said casing further having a passage placing the two cylinders in communication, a piston rod connecting said pistons, a valve actuated to turn on the rectilinear movement of said rod, said valve being situated in said chamber and having shoes for controlling said ports in the chamber.

11. In combination with a locomotive having a source of steam and valve chests, of an attachment therefor comprising a chamber in communication separately with the source of steam and the steam chests, valve means in the casing for controlling the communication between the source of steam and said steam chests, and actuating means for said valve means being remote and independent of said valve means and coupled thereto, said actuating means having opposed surfaces of differential area alike accessible to the pressure within the steam chests whereby such pressure acting against the surface of larger area will shift the actuating means in one direction to close said valve means, and means to trap the steam pressure against the face of the actuating means having the smaller area whereby, when the steam chest pressure falls, such accumulated pressure will act to shift the actuating means in the opposite direction and open said valve means.

In testimony whereof we affix our signatures.

RICHARD W. BRADEN.
CHARLES STERN.